(12) United States Patent
Lucas et al.

(10) Patent No.: US 9,199,170 B2
(45) Date of Patent: Dec. 1, 2015

(54) PASS-STRUCTURED GAME PLATFORM

(71) Applicants: Keith V. Lucas, Half Moon Bay, CA (US); David Baszucki, Portola Valley, CA (US)

(72) Inventors: Keith V. Lucas, Half Moon Bay, CA (US); David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 370 days.

(21) Appl. No.: 13/708,413

(22) Filed: Dec. 7, 2012

(65) Prior Publication Data

US 2014/0162776 A1    Jun. 12, 2014

(51) Int. Cl.
*A63F 9/00* (2006.01)
*A63F 13/40* (2014.01)
*A63F 13/30* (2014.01)

(52) U.S. Cl.
CPC .................. *A63F 13/10* (2013.01); *A63F 13/12* (2013.01); *A63F 2300/5526* (2013.01); *A63F 2300/6018* (2013.01)

(58) Field of Classification Search
None
See application file for complete search history.

(56) References Cited

U.S. PATENT DOCUMENTS

| | | | | |
|---|---|---|---|---|
| 7,867,094 B1 * | 1/2011 | Wisdom et al. | | 463/43 |
| 8,332,544 B1 * | 12/2012 | Ralls et al. | | 710/8 |
| 2006/0068911 A1 * | 3/2006 | Pirich et al. | | 463/40 |
| 2007/0087799 A1 * | 4/2007 | Van Luchene | | 463/1 |
| 2007/0238499 A1 * | 10/2007 | Wright | | 463/1 |
| 2008/0004093 A1 * | 1/2008 | Van Luchene et al. | | 463/1 |
| 2008/0004119 A1 * | 1/2008 | Van Luchene et al. | | 463/42 |
| 2008/0016176 A1 * | 1/2008 | Leitner | | 709/217 |
| 2008/0078758 A1 * | 4/2008 | Shimura et al. | | 219/717 |
| 2011/0107239 A1 * | 5/2011 | Adoni et al. | | 715/757 |
| 2012/0015742 A1 * | 1/2012 | Vanbragt et al. | | 463/42 |
| 2012/0077580 A1 * | 3/2012 | Mahajan et al. | | 463/29 |
| 2012/0142429 A1 * | 6/2012 | Muller | | 463/42 |
| 2012/0231889 A1 * | 9/2012 | Lee et al. | | 463/42 |
| 2012/0252579 A1 * | 10/2012 | Sethi et al. | | 463/40 |
| 2012/0274585 A1 * | 11/2012 | Telfer et al. | | 345/173 |
| 2012/0276997 A1 * | 11/2012 | Chowdhary et al. | | 463/31 |
| 2013/0079107 A1 * | 3/2013 | Owen et al. | | 463/25 |
| 2013/0079140 A1 * | 3/2013 | Watkins et al. | | 463/37 |
| 2013/0178281 A1 * | 7/2013 | Ayyar et al. | | 463/30 |
| 2014/0066177 A1 * | 3/2014 | Zalewski | | 463/24 |
| 2014/0080560 A1 * | 3/2014 | Knutsson | | 463/10 |

* cited by examiner

*Primary Examiner* — Seng H Lim
(74) *Attorney, Agent, or Firm* — Donald R. Boys; Central Coast Patent Agency, Inc.

(57) ABSTRACT

A game platform has a network-connected server having one or more processors coupled to a non-transitory physical storage medium, and software (SW) executing on the server. The software provides an interactive interface for a game creator, tools selectable in the interactive interface enabling the game creator to create a game having a virtual environment including game objects that may be moved by a player in the game relative to other objects and structures, a mechanism enabling the game creator to apply impediments to specific activities initiated by the player, and one or more interactive mechanisms for presenting choices to the game player. In response to the player attempting an activity to which an impediment has been applied, the game dynamics apply the impediment.

9 Claims, 7 Drawing Sheets

PASS-STRUCTURED GAME PLATFORM

CROSS-REFERENCE TO RELATED DOCUMENTS

The present invention is related to co-pending application Ser. No. 13/412,921 filed Mar. 6, 2012, and the entire disclosure of that application is incorporated in the present application at least by reference. Priority is not claimed to Ser. No. 13/412,921.

BACKGROUND OF THE INVENTION

1. Field of the Invention

This invention is in the technical area of virtual environments, and pertains in particular to video games.

2. Description of Related Art

Video games are notoriously well-known in the art, and in many games players control avatars that are functional in the game. For example, a player may move the avatar in a virtual environment, cause the avatar to run, jump or swim, open doors, scale walls, pick up weapons and use the weapons in contentions with other characters in the game. The user may control an avatar to access a vehicle, such as a helicopter, and to fly the helicopter over the virtual landscape. The landscape may move and change as a game progresses. Avatars may cooperate with one another as well as contend with one another.

Many games have underlying rules by which players may accumulate points, collect artifacts or acquire virtual currency. The rules of a game are limited only by the imagination of the creator of the game, who typically creates the game through high-level programming languages. Salable video games are a very big industry, and creators go the great lengths to provide games in which the dynamics of elements and objects in the game behave realistically.

The present inventors work and innovate in a gaming enterprise wherein systems and tools are provided for clients to create games, rather than just to participate in games that have been completely preprogrammed. In this environment a software suite is provided whereby a client may access tools, artifacts and objects to create landscapes, building, machines such as vehicles and weapons, bridges, doors, lakes, waterfalls, and much more. The client also has access to tools to create dynamics for objects and functional relationships between objects. Once a client has created a game using the pre-programmed elements, the creator client can publish the game on the platform that supports the virtual environments for the games, and other players may join and participate in the games created.

The present inventors have conceived a new dynamic for such games created by clients that brings a new dimension of contention and accomplishment.

BRIEF SUMMARY OF THE INVENTION

In one embodiment of the present invention a game platform is provided, comprising a network-connected server having one or more processors coupled to a non-transitory physical storage medium, and software (SW) executing on the server from the non-transitory physical storage medium, the SW providing an interactive interface for a game creator, tools selectable in the interactive interface enabling the game creator to create a game having a virtual environment including game objects that may be moved by a player in the game relative to other objects and structures, a mechanism enabling the game creator to apply impediments to specific activities initiated by the player, and one or more interactive mechanisms for presenting choices to the game player. In response to the player attempting an activity to which an impediment has been applied, the game dynamics apply the impediment.

In some embodiments impediments comprise blocking a player's ability to accomplish an activity. Also in some embodiments impediments comprise altering the manner in which a player may perform an activity. In some embodiments the activity may be one of opening a door, passing through a door, crossing a bridge, jumping to a higher level in the game, picking up an object, or operating a vehicle, and the blocking prevents the player from engaging the activity.

In some embodiments impediments include limiting speed and/or direction of movement or height of jumping. Also in some embodiments the game dynamics, sensing a player attempting an activity to which an impediment has been applied, displays an interactive window enabling the player to purchase a pass to remove the impediment. Also in some embodiments there may be a mechanism accessible by a player to review and purchase passes applicable to a pass-structured game.

In some embodiments there may be a transaction system adapted to monitor and adjust virtual currency balances for the game creator, players of the game and an enterprise hosting pass-structured games, wherein the transaction system adjusts virtual currency balances according to sale and purchase of passes in a pass-structured game. A player may be offered and may purchase super powers in a game, the super powers enhancing the player's abilities in the game. In some cases the level of enhancement is variable relative to purchase price.

DETAILED DESCRIPTION OF THE INVENTION

Figure 1:
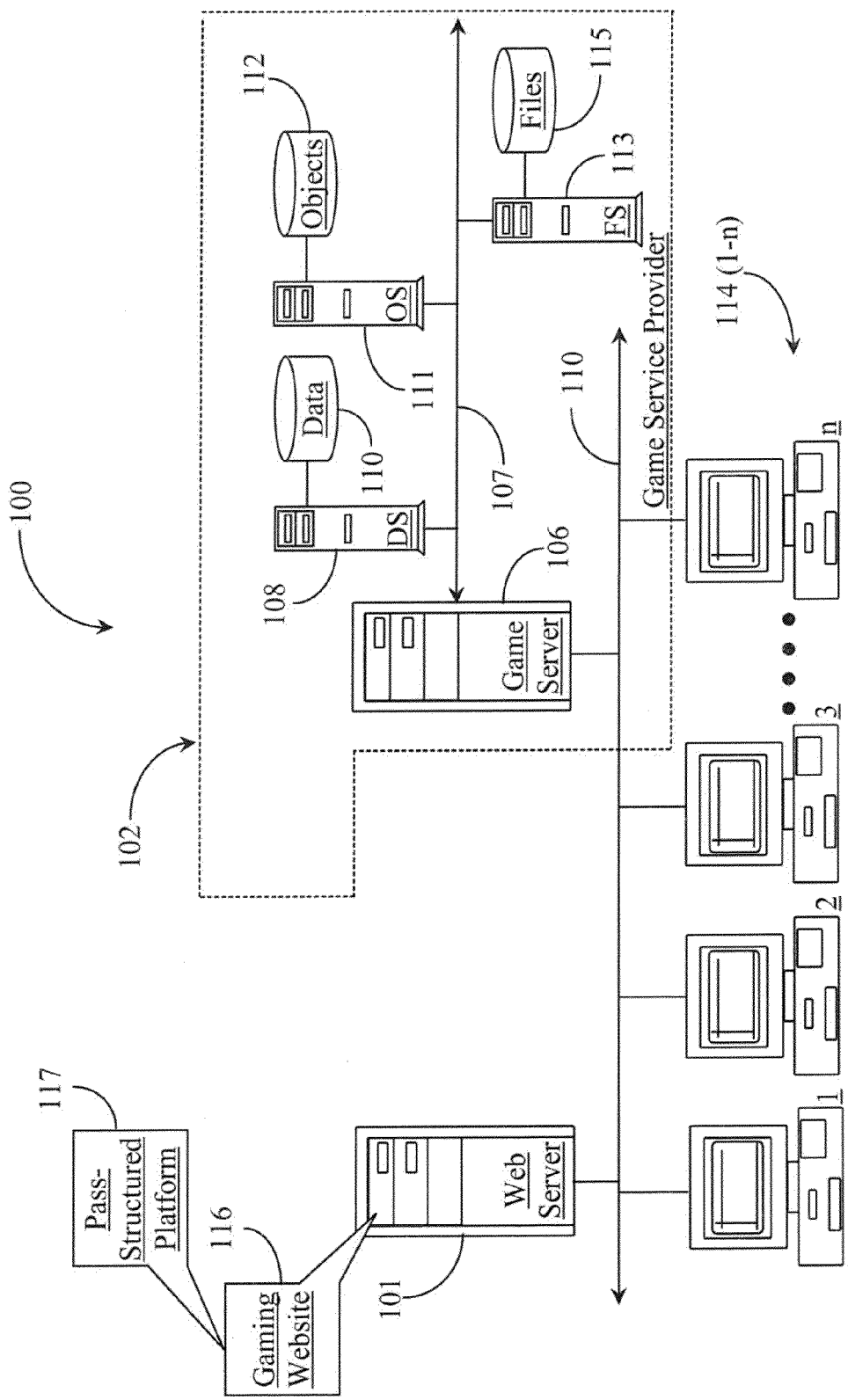
FIG. 1 is an architectural overview of a gaming network supporting a pass-structured gaming environment and platform according to an embodiment of the present invention.

FIG. 1 is an architectural overview of a gaming network supporting a pass-structured gaming environment and platform according to an embodiment of the present invention. Network 100 includes the well-known Internet network represented herein by a network backbone 110. Network backbone 110 represents all of the lines, equipment, and access points that make up the Internet network as a whole. Therefore, there are no geographic limitations to the practice of the present invention.

Internet backbone 110 supports a web server 101 that includes a non-transitory digital storage medium installed internally or otherwise accessible to the server. This storage medium contains all of the data and software required to provide the functions of web server 101. Web server 101 hosts websites for entities such as gaming website 116. Website 116 is a member website for persons interested in online gaming. One good example of such a website would be one providing a gateway to play online two-dimensional and three-dimensional games. Although not illustrated here, a website like website 116 may be assumed to include at minimum, a login interface for affecting member sign-in. Website 116, also referred to herein as a gaming site, also includes universal resource locator (URL) links to online games that are served via a game server as will be detailed further in this specification. In an embodiment of the present invention there is also a link to a website that provides tools for a client to create games, and in one embodiment to create games in a specific novel way that includes provision of passes and tokens that are applicable and usable in playing games created in the specific novel manner taught in this specification. This novel platform is represented by software 117 as a part of Gaming Website software 116 executable on Web Server 101.

Network 100 includes a game service provider 102. Game service provider 102 is an entity that specializes in providing the computing power and physics simulation of games and game objects interacted with in a game. In many gaming systems the "game server" may be hosted by a third-party entity. In this example, provider 102 includes a game server 106. Game server 106 includes a non-transitory digital medium installed internally or otherwise accessible to the server that contains all of the data and software required to provide the functions of game server. In this regard, there may be other dedicated servers that are ported to game server 106 for the purpose of providing specific components or game elements in real time as they are required. Game server 106 has a high-speed data link to a file server (FS) 113, an object server (OS) 111, and a data server (DS) 108. All of these dedicated servers include a non-transitory digital medium installed internally or otherwise accessible to the server that contains all of the data and software required to provide the functions of those servers.

Data server 108 has connection to an external data repository 110 adapted to host game data. Object server 111 has connection to a data repository adapted to host game objects and elements. File server 113 has connection to a data repository 115 adapted to host game files. Game service provider 102 provides high-powered game computing, physic simulation, (simulator not illustrated) and other game related data.

Internet backbone 110 supports, logically in this example, multiple Internet users 114 (1-n). Users 114 (1-n) are illustrated as personal computers in this example, but may be other computing appliances such as Laptop computers, 3G and 4G Smart Phones, I-Pads, or some other personal digital assistant (PDA). Actual connection to the Internet might vary between users 114 (1-n), for example suitable connections may include cable/modem, wireless broadband, Wireless Fidelity (WiFi), or other carrier networks or Internet Service Providers (ISP's).

In various embodiments of the present invention users of computerized appliances 114 may access Web Server 101, and through an interactive interface choose to access and play games served by Game Server 106, or in some cases by Web Server 101, and may also select to access the Pass-Structured platform through SW 117. The Pass-Structured platform and functions of this platform are a particular object of the present invention.

The present inventors are associated with a gaming enterprise in which tools are provided for users of the system to create virtual environments and games, which the creators may then launch and invite or expose others to play their games. In some cases the creators and other users may associate in social groups, such as "friend" groups. In a simplified scenario users are provided with objects, such as terrain blocks with which they may create terrain, supported by powerful background programming. The background software provides various engines for such as terrain generation, assembling buildings and other structures, and for selecting, in some cases, different application of physical principles to apply to objects in a game. In some cases automatic and semi-automatic systems may be provided for generation of game elements and objects. Also in some cases a user can start with a game previously created by the same user, or even by another user, and create a new game by deletion addition and other editing procedures. The skilled person will understand that there are many tools that may be used for game creation. In some cases Character objects are provided which users may select and alter and edit, and in some cases customize with costumes. Users may choose to some extent physical simulation and may create and customize their own worlds using a scripting language. In one instance the scripting language is an edition of the well-known Lua language developed in Rio de Janeiro.

Figure 2:
FIG. 2 is an example of a single frame displayed for a game created by a user.

FIG. 2 illustrates one example of a display of a game created by a user, illustrating landscape, sky, buildings, trees, tables, characters (avatars), and more. The skilled person will understand that this is but one frame of a game in which a player may manipulate avatars and other objects in the virtual environment, and that the game is a dynamic rendering that changes for the user as the user interacts with interactive objects and controls. Controls in playing a game may include cursor control by pointer device, including point and click and drag techniques as are well-known, and also keyboard and special control interfaces that might be connected to a computerized device used by a game creator or player. These interfaces may include touch screen, gesture control, and other means of input/output.

The skilled artisan, familiar with games of the sort described in this specification, will understand that a game may have avatars, as previously described, that may be moved in the virtual environment of the game. There may also be objects in the environment that a player may cause an avatar to manipulate. For example, a player may control an avatar to push a large boulder up a hill, or to trip the boulder to roll down a hill, under control of a physics engine that causes the boulder to roll and bounce as one would expect a real boulder to behave under the same circumstances. There may be vehicles, like planes, boats, motorcycles and the like that may be used by avatars in a game under control of a player of the game. There may be doors that must be unlocked and opened before an avatar may pass into a building or into another region of the game. There may be bridges across streams or lakes over which an avatar may be caused to travel. All of these characterizations are known in the art at the time of filing the present patent application.

Another characterization of games in the system of the enterprise with which the inventors are associated is virtual currency. Such currency may take the form of virtual dollars, (pesos, yen), or tickets. There may be an exchange for conversion, and in some situations there may be an exchange for converting virtual currency into virtual prizes, or real prizes, or even real currency. Virtual currency may be awarded for competence or skill in playing a game, for scoring a lot of points if points are awarded in a game, and for many other activities of a player. Separate statistics may be kept for a player's currency, and a player in some circumstances may visit virtual stores where his or her currency may be paid for virtual or real items. A player may also purchase virtual currency with real currency.

Of central importance in embodiments of the present invention, yet to be described in detail, is the fact of manipulation of avatars and objects in a game by a player, and the interaction of the avatars and objects with other elements of a game. An avatar may, for example, controlled by a player, discover a sword or other weapon lying on the game terrain, or leaning for example against another object. The avatar may be controlled by the player to pick up the sword and to use it in contention with another avatar. An avatar may be moved to unlock and open a door, to pass through the door, to step onto a bridge and to continue to cross the bridge. An avatar may be caused to mount a motorcycle, to start the engine, and to drive away. The speed may be varied for the motorcycle.

Of importance in embodiments of the present invention is that all of the activities that are enabled in a game, may in some manner be made difficult in varying degrees, or denied altogether. Where a game creator may enable a player to cause an avatar to open a door, the opening of the door may be made difficult in varying degree, or denied altogether. Where an avatar may be empowered to jump into the air, the height to which an avatar may jump may be controlled depending on a variety of factors. The maximum speed of a vehicle may be governed, or the engine caused to die, leaving the vehicle disabled. Anything that can be done may be enhanced, impeded, or denied. And in various embodiments of the present invention, a player's virtual currency becomes a factor in the player's ability to navigate a game and cause activities to happen in the game.

It was described above that tools are provided at server 101 for a user at any computerized appliance 114 to create one or more games. In an embodiment of the present invention a special platform 117 is provided wherein users may create games according to embodiments of this invention. The inventors term this platform a "pass-structured" platform. A new dimension is provided for the game creator to deny any or all activities in a game, or to restrict or otherwise govern activities, and to provide special circumstances the inventors term passes for a player to be able to accomplish an activity, or to enhance the dynamic of the activity.

Figure 3A:
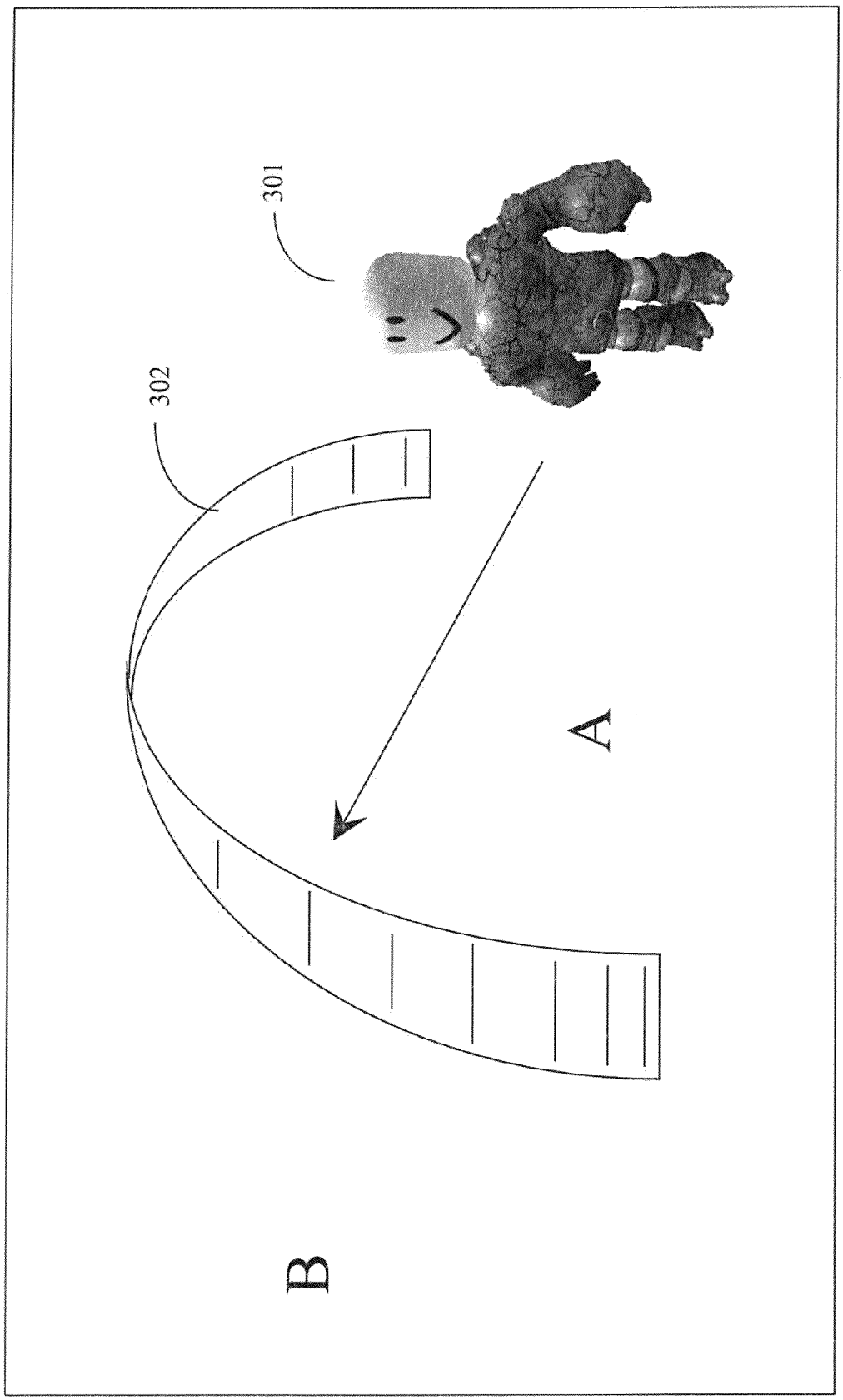
FIG. 3a is a simple illustration of a situation in a game in which an avatar is in proximity to an arch.

FIG. 3*a* is a simple illustration of a situation in a game in which an avatar 301 is in proximity to an arch 302. In play of the game there may be motivation for the player to move avatar 301 through arch 302 from region A in the environment to region B in the environment. In this simplified example the player may move avatar 301 by click and drag. So the player clicks on avatar 301 and moves the avatar toward the arch, meaning to pass the avatar through the arch.

Figure 3B:
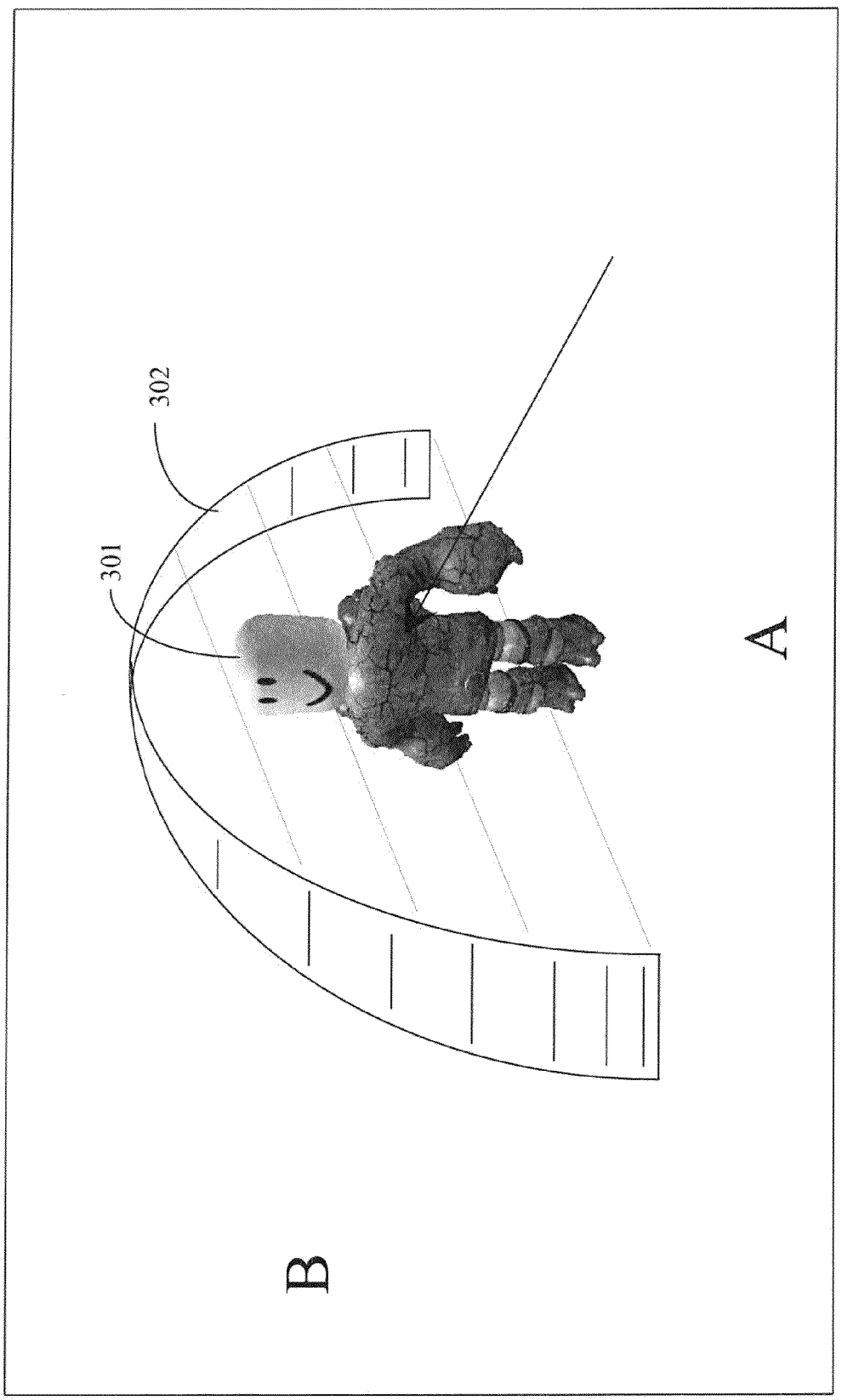
FIG. 3b shows the game of FIG. 3a wherein the avatar has been moved by a player to the initial plane of arch 302.

FIG. 3*b* shows the game circumstance when the avatar has been moved by a player to the initial plane of arch 302, which has been indicated by lines in the initial plane of the arch. In an embodiment of the invention the creator of the game may have configured the arch to deny passage unless the player has a pass to allow passage through the arc. The circumstance of the player attempting to move avatar 301 through the arch is determined by the game software by position of the arch and the avatar in the dynamics of the game. Every game object has properties in a game, one of which is position in the virtual environment.

Figure 4:
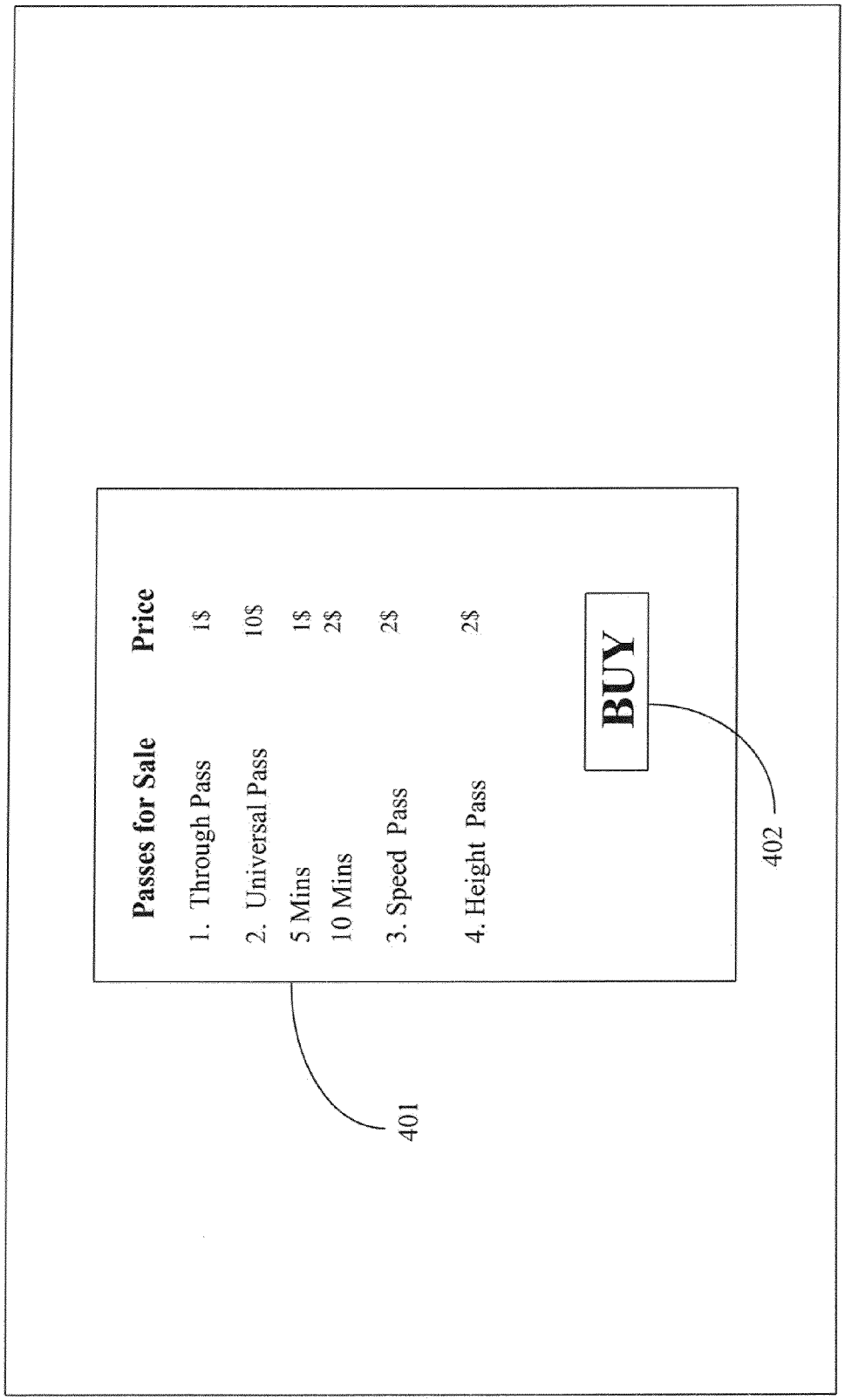
FIG. 4 illustrates a window wherein a player may use virtual currency to purchase one or more passes for dealing with denials and obstructs in a game.

In one embodiment of the invention the creator of the game may have configured the game for interaction with a player before the player actually enters the game and commences play. In this embodiment the player may be presented with a window 401, as shown in FIG. 4, wherein the player may use virtual currency to purchase one or more passes for dealing with denials and obstructs in the game. Passes in embodiments of the invention can be many and varied. In the simple example shown the aspiring player may purchase a "Through" pass for $1. In one embodiment this pass will enable the player to move an avatar or any other object through any portal structure in the game, such as doors, archways, windows and the like. A "Universal" pass is for sale which will allow the player to bypass any impediment that has been set in the game. A diminished version of a universal pass may be purchased for a lesser amount, but will expire after 5 minutes, ten minutes, or some other selected time. A speed pass allows the player to move objects as quickly as the maximum allowed. Without a speed pass the speed at which a player may move an object may be governed to a lower speed. A height pass will allow a player to jump an object to a maximum height, and without a height pass, the height an object may attain may well be restricted to a lower height than maximum.

The skilled person will realize that the options shown are a very small sampling of passes that might be configured for controlling activities of players in manipulating objects in a game and in interaction of other sorts as well, which may be restricted by the creator of the game.

At the bottom of window 401 there is a BUY button that a player may operate to pay for the pass or passes that player has selected in window 401. As the player selects passes they may change color to indicate selection, and another click on the same pass will de-select that pass and change the color back to the original color, or no color. When the user presses the BUY button the total of the prices is calculated and that amount of virtual currency is deducted from the store of the selecting player. If the system determines the player has insufficient virtual currency, the system may enable the player to buy additional virtual currency with real currency. In some embodiments a pre-programmed portion of the cost paid by the player will add to the virtual currency store of the creator of the game, and a portion may accrue to the enterprise that supports the platform and provides the electronic environment for the creation, publishing and playing of the games.

Returning now to FIG. 3*b*, if the player moving avatar 301 to pass through arch 302 has pre-purchased a "Through" pass as described with reference to FIG. 4, then avatar 301 will simply pass through the arch as the player intends. If the player did not purchase a pass, then one of several things will happen. Firstly the avatar will not be allowed to pass through the arch. It will stop at the front plane of the arch regardless of efforts by the player to move the avatar further. In some embodiments the front plane of the arch may be colored in to indicate blocked passage. In some embodiments the avatar may shake or vibrate. In some embodiments there may be an audio alert. Or any combination of such indicators or other indicators may be activated.

Figure 5:
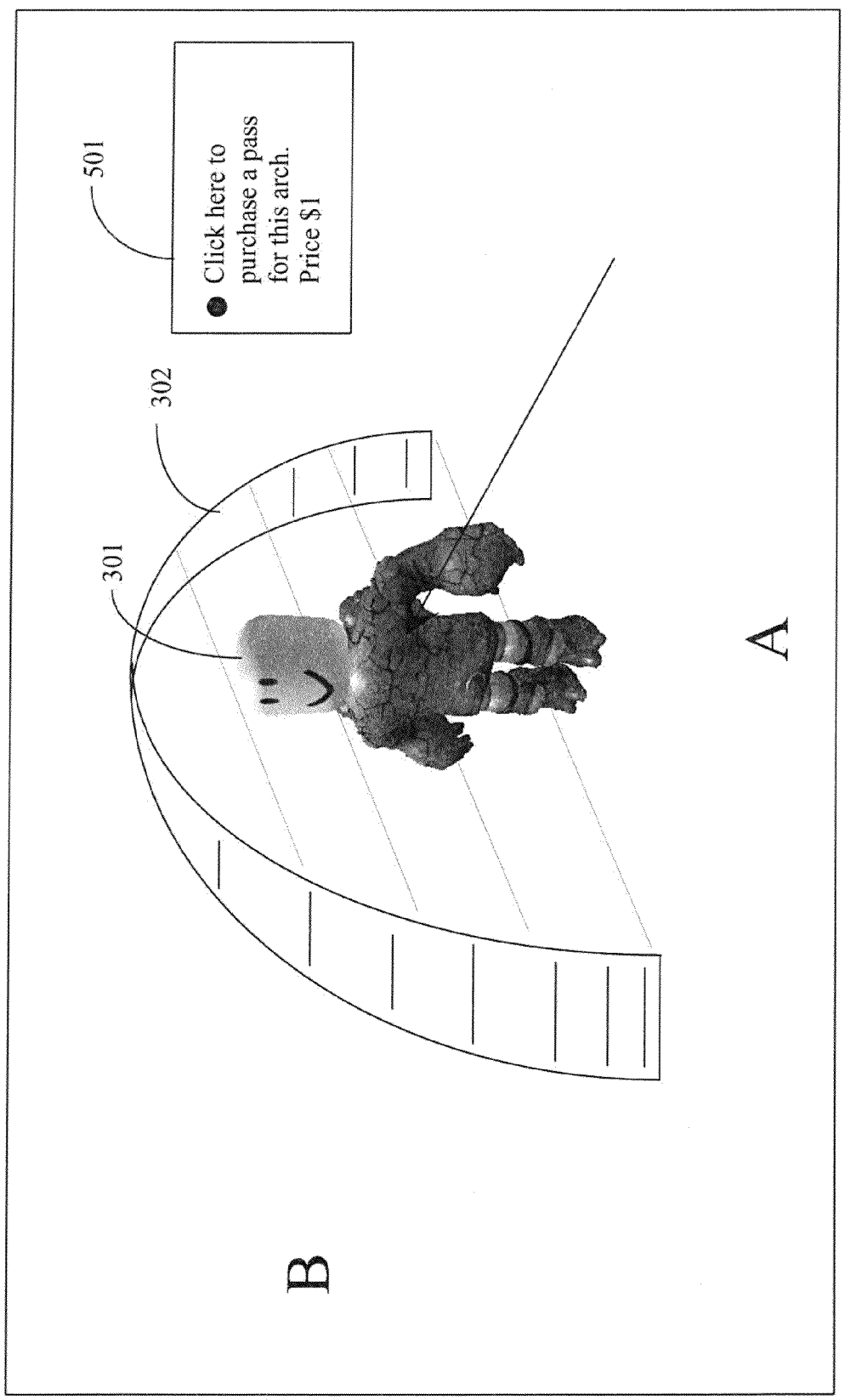
FIG. 5 illustrates the situation of FIG. 3b, wherein the avatar has been blocked from passing through the arch, with a pop-up window displayed for the player.

If the player finds the way blocked, and is unable to move the avatar through the arch, in one embodiment a pass will be offered to the player. This can come in the form of a pop-up window offering a pass, one-time, timed, or universal to the player. Prices in this case may be higher than if the player had purchased the proper pass or passes prior to playing the game. FIG. 5 illustrates the situation of FIG. 3*b*, wherein the avatar has been blocked from passing through the arch, with a pop-up window 501 displayed for the player. If the player selects to purchase a pass for this arch, the pop-window disappears and the impediment to moving the avatar through the arch disappears.

In some embodiments the pop-up window may present further options to the player, who may select to purchase a one-time pass for this arch, or may select to purchase a timed or universal through pass, for example. In this embodiment the window may appear much as window 401 of FIG. 4.

It was described above impediments or complete blocking may be applied for any activity that is ordinarily enabled in a game created by a user. This includes moving through an arch, as described above, opening a door, crossing a bridge, jumping up to a higher level, picking up a weapon or other object, and just about any other task or activity that may be possible in the game. In some cases the activity that a player might attempt may be completely blocked. In other situations the impediment applied may be variable. For example, the velocity with which a player may throw a weapon may be limited, and the player may be offered a pass that will set a higher velocity for such activity. The height to which an avatar might jump may be limited, and the player may be offered a pass that will increase the jump height.

In another embodiment a player may be offered a pass that ordains super powers. That is, for an avatar controlled by that player, the avatar, assuming the player has purchased the option, may be able, for example to levitate and fly. The same avatar, possessing super power, may be able to move boulders and other heavy objects, or to pick up and move a bridge or a building, which would not be possible ordinarily under control of the physics engine operating in the game.

In embodiments of the invention various entities may have balances of virtual currency, such as players, game creators, and the enterprise that provides the system that controls the games. A transaction service notes each transaction, the rules and agreements associated with each transaction, and adjusts balances for each entity as activity proceeds. In various embodiments this circumstance adds a new dimension to the strategy in gaming. For example, a user may create a game in which virtual currency rewards are provided for players of the game for achieving certain goals. For example, a player may be challenged to move an avatar through a complicated maze, and the player's efforts may be timed. Achieving a complete navigation through the maze within a certain time may be rewarded with a sack of cash. Less cash will be paid for a lesser time. The player may purchase passes or powers that increase his performance in the game, but the passes cost virtual currency. An object for the player is to attain the cash rewards by purchasing passes at a lesser total cost than the rewards for performance.

In some embodiments there may be more than one sort of virtual currency. For example, there may be virtual currency associated with the platform, which a player may purchase with real currency, or acquire by other means, and this currency may be used to buy, for example, re-usable passes for games. The platform currency may be common to some or all games. There may also be virtual currency associated with individual games, and may be awarded and used only in the particular game.

It is an important point that the game creator is enabled to create and impose the various impediments and blocks in the game he or she creates. The creator may select places and circumstances in the game where passes may be required or may be effective. This ability is enabled by software that will intervene at places in the game where the creator imposes a block or impediment, and check to see if the player has the proper pass, and the system can be enabled by the creator to offer passes for sale under different circumstances.

In some embodiments there may be more than one player in a game, and the two or more players may be enabled to interact such that passes may be transferrable. One player may be able to petition another for a pass, or a loan to purchase a pass. In another embodiment a game creator may create relatively more complicated impediments in a game. For example, a door may require a pass, but may be programmed such that if a player tries the door, and does not have a pass, but returns to the door and tries again, and is blocked, but tries a third time the door will open without a pass. A player is then challenged to learn how to overcome an obstacle without purchasing a pass.

Figure 6:
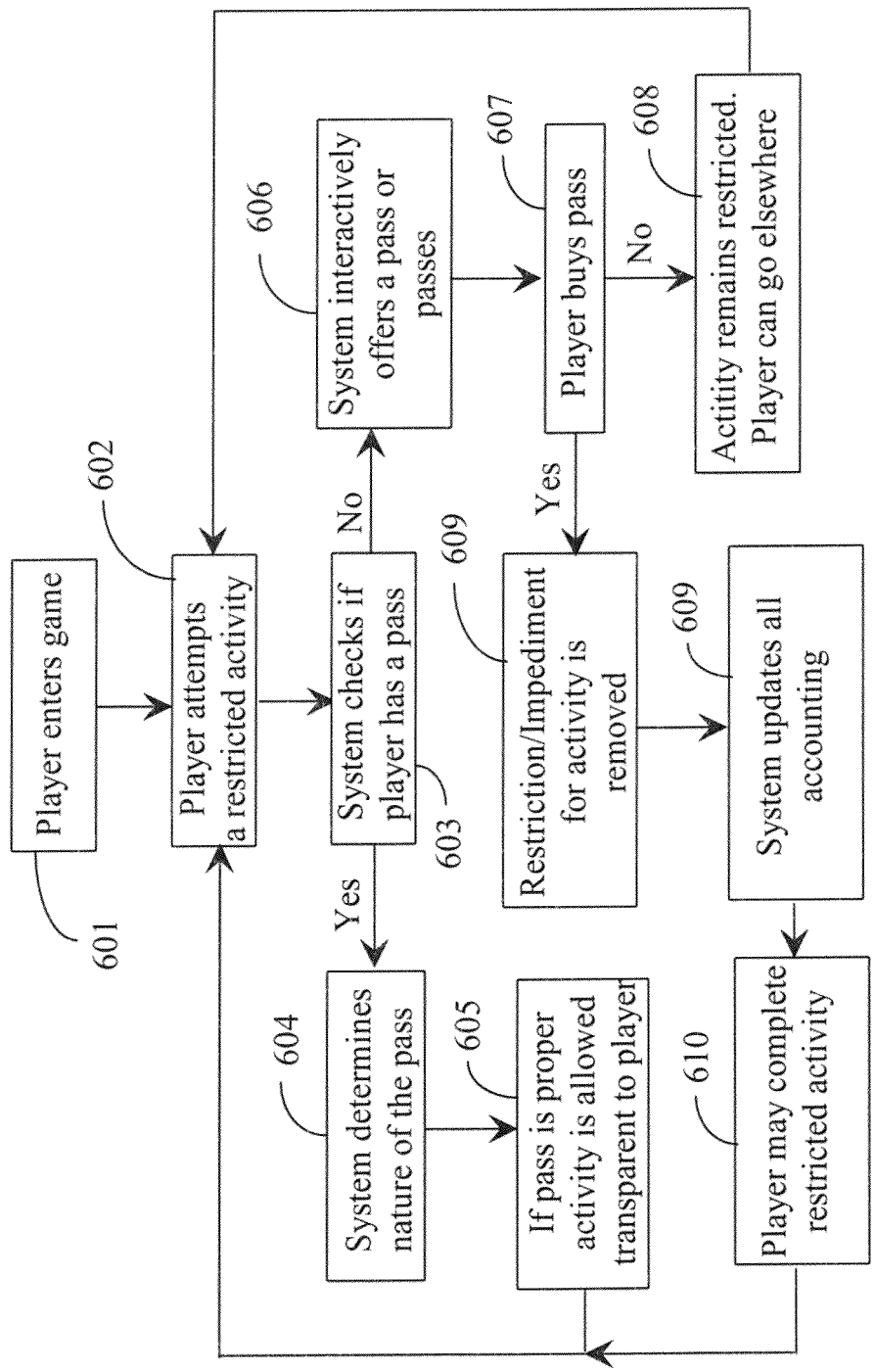
FIG. 6 is a flow diagram illustrating a method in an embodiment of the present invention.

FIG. 6 is a flow diagram illustrating a method in an embodiment of the present invention, for proceeding by a player in a game created to include restricted activities requiring purchase of passes by a player. At step 601 a player enters the game. At step 602 the player attempts an activity restricted by the dynamics of the game. Software at this point intervenes at step 603 and checks if the player has a pass for the restricted activity. If the answer is yes, the system checks the nature of the pass at step 604. In some cases the restriction may be binary (YES/NO). In other cases the restriction may be variable and dynamic. For example, the restriction may be a governor on speed of movement. The player may have a pass for max speed, or perhaps for 0.75max speed. The system enforces whatever the nature of the pass declares at step 605. This control by the system is very quick, and the result will ordinarily be transparent to the player, who will continue activities in the game until he or she once again encounters a restricted activity. Control returns to step 602 for that player.

If at step 603 the system determines the player does not have a pass, now the player notices. The activity attempted is blocked. The system at step 606 may interactively offer a pass or passes. If the player buys a pass for this activity at step 607, the restriction or impediment is removed at step 609, and the system updates all accounting at step 610. That is, the system will deduct the price of the pass from the player's account and credit other accounts according to pre-configuration for the game. Now the player may complete the restricted activity at step 611 and control goes back to step 602 to monitor if this player might again attempt a restricted activity.

If at step 607 the player does not buy a pass, then at step 608 the activity remains restricted for that player, and the player may go elsewhere. Control returns to step 602 to see if the player returns to the restricted activity or attempts another restricted activity.

In some embodiments restricted activity may take other forms. For example, in some cases the system may be programmed to make certain activities illegal. A player will be monitored as in FIG. 6 for these activities, and the player may be allowed to participate in one after another of these activities up to a point. In this case the system is monitoring the illegal activity of the player, and keeping a rap sheet. At some programmed point the player may be apprehended and incarcerated. In this case the player may be able to buy her way out of prison, may be able to bribe the judge, or may be able to negotiate a reduced sentence wherein she may be able to continue play, but under restriction of an "ankle bracelet" that will configure restricted activity for that player, perhaps at least until a sentence is served. There are myriad such possibilities.

The nature of restrictions and release from restrictions for selected activities in a game according to embodiments of the present invention depends upon the nature of the tools provided to the creator of the game, and the use of these tools to create and configure the game. Once the game creator is satisfied (there may be test runs) he or she may publish the newly-created game. Then the game might be stored and served by Game Server 106 (FIG. 1). This, however, is not a requirement in the invention. The games can be served from other network-connected servers as well.

The skilled person will understand that there are many alterations that might be made to embodiments of the invention as described herein, without departing from the spirit and scope of the invention. In various embodiments, wherever there are dynamics that might be enabled in a game, impediments might be applied by a game creator, and release from impediment might be acquired by a player purchasing such release, such as in the nature of a pass as described herein. Impediments might be applied in a binary fashion (Yes/No) or may be variable, such as a governed speed, for example. Passes might be purchased by a player in advance of play, or might be purchased during play as allowed by pop-up windows, for example. And a pop-up window is but one of the ways that a player may be enabled to overcome an impediment. There might be, for example, in a Pass-Structured game an icon in a task bar that a player may use to access a window to get a pass.

In some embodiments there may be provision for a player to determine where and how many impediments there might be in a pass-structured game. A player may be able to get a temporary map under some circumstances, showing where impediments might be. Such a map might be coded to disappear after a second or two, but that may be enough for some players to get a bit of an advantage. A player might purchase this and other hints and guides that might be helpful in navigating such a game.

The scope of the invention is limited only by the claims that follow:

The invention claimed is:

1. A gaming platform, comprising:
a network-connected server having one or more processors coupled to a non-transitory physical storage medium; and
software (SW) executing on the server from the non-transitory physical storage medium, the SW providing:
an interactive interface for a game creator;
tools selectable in the interactive interface enabling the game creator to create a plurality of games having a virtual environment including game objects that may be moved by a player in the game relative to other objects and structures;
a physics engine operating the virtual environments in each of the plurality of games;
a mechanism enabling the game creator to apply impediments to specific activities initiated by the player, the impediments altering the manner the physics engine initiates the activity in the virtual environment; and
one or more interactive mechanisms for presenting choices to the game player;
wherein, in response to the player attempting an activity to which an impediment has been applied, the software applies the impediment and one or more interactive mechanisms display a pop-up window presenting at least one of the choices to the player including enabling the player to purchase a pass to remove the impediment and continue the activity.

2. The game platform of claim 1 wherein impediments comprise blocking a player's ability to accomplish an activity.

3. The game platform of claim 1 wherein impediments comprise altering the manner in which a player may perform an activity via altering operation of the physics engine.

4. The game platform of claim 2 wherein the activity is one of opening a door, passing through a door, crossing a bridge, jumping to a higher level in the game, picking up an object, or operating a vehicle, and the blocking prevents the player from engaging the activity.

5. The game platform of claim 3 wherein impediments include limiting speed and/or direction of movement or height of jumping.

6. The game platform of claim 1 further comprising a mechanism accessible by a player to review and purchase passes applicable to a pass-structured game.

7. The game platform of claim 1 further comprising a transaction system adapted to monitor and adjust virtual currency balances for the game creator, players of the game and an enterprise hosting pass-structured games, wherein the transaction system adjusts virtual currency balances according to sale and purchase of passes in a pass-structured game.

8. The game platform of claim 1 wherein a player may be offered and may purchase super powers in a game altering the manner the physics engine operates the virtual environment, the super powers enhancing the player's abilities in the game.

9. The game platform of claim 8 wherein the level of enhancement is variable relative to purchase price.

* * * * *